(No Model.)
I. A. F. BANG & M. C. A. RUFFIN.
PROCESS OF MAKING ACETIC ACID.
No. 432,926. Patented July 22, 1890.
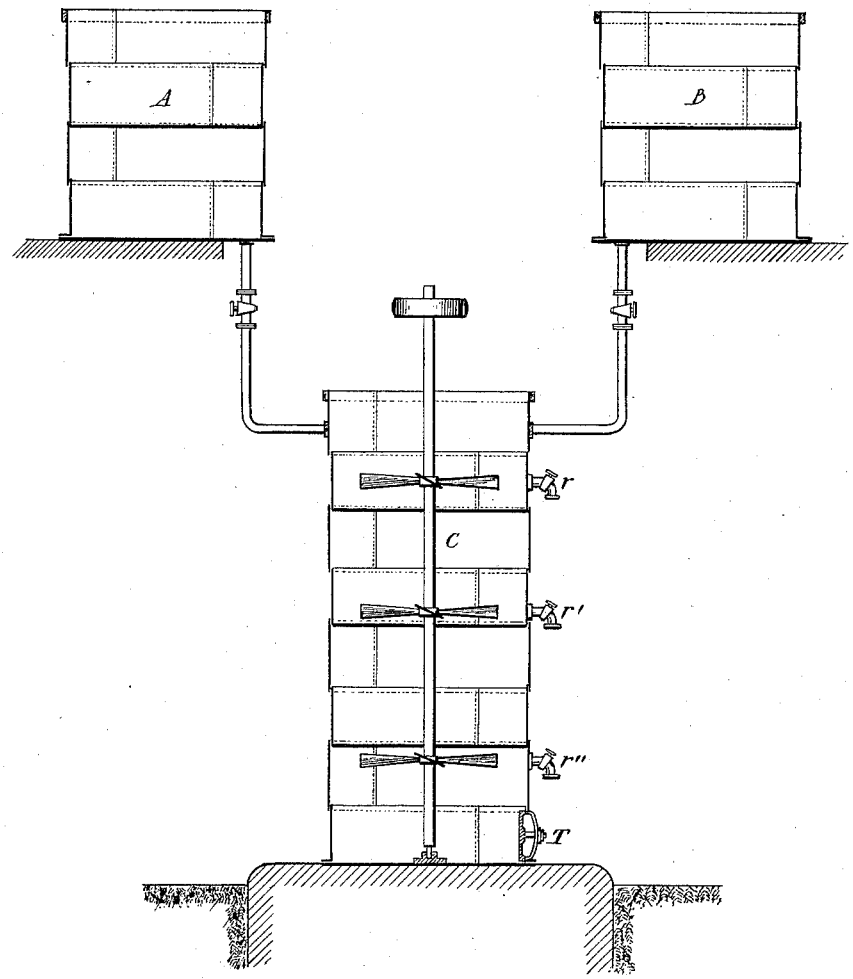

UNITED STATES PATENT OFFICE.

IVAR AXEL FERDINAND BANG AND MARIE CHARLES ALFRED RUFFIN, OF PARIS, FRANCE.

PROCESS OF MAKING ACETIC ACID.

SPECIFICATION forming part of Letters Patent No. 432,926, dated July 22, 1890.

Application filed May 24, 1890. Serial No. 353,008. (No specimens.)

*To all whom it may concern:*

Be it known that we, IVAR AXEL FERDINAND BANG and MARIE CHARLES ALFRED RUFFIN, residents of Paris, in the Republic of France, have invented certain Improvements in the Manufacture of Acetic Acid, whereof the following specification is a full, clear, and exact description.

The method heretofore commonly employed for the production of acetic acid consisted in the treatment with sulphuric or hydrochloric acid of the crude acetate obtained by saturating pyroligneous acids with calcareous substances. The acetic acid resulting from these operations is but little concentrated, being necessarily derived from strongly-hydrated acids. Besides this, the acetic acid is very impure, because the acetate employed contains about thirty per cent. of foreign matters. When under these circumstances sulphuric acid is used to produce the reactions, the mass becomes thick and the subsequent operations are thereby rendered difficult. Considering, however, the great difference in price between the two acids, it is often necessary in certain localities to employ sulphuric acid.

Our present invention has for its object to overcome these difficulties and to render the treatment by sulphuric acid practical and economical, at the same time producing acids which are purer and of a higher degree of concentration than heretofore obtained.

The following is our mode of procedure: We dissolve crude acetate of lime in boiling water until complete saturation ensues, and then decant the supernatent liquor, separating it from insoluble impurities. After having ascertained by preliminary tests the quantity of sulphuric acid necessary to decompose all the dissolved acetate, we pour the very hot solution of acetate into a large reservoir of rather greater height than width, and then add by degrees, continuously stirring the mass, the predetermined quantity of sulphuric acid. This acid, however, is previously mixed with cold water, (two volumes of water to one of acid,) the mixture becoming sufficiently hot if used immediately. If, however, the acid has been previously prepared and if it be desired to employ weak acid, it will be necessary to heat it to at least 70° centigrade before adding it to the acetate. The reaction takes place immediately, forming an insoluble sulphate and liberating an aqueous acetic acid; but owing to the high temperature at which the decomposition is effected the sulphate of lime does not precipitate in an abundant and slimy mud, as usual, but in a crystalline and very dense powder, in no wise slimy, and which deposits very easily and can be dried by pressure, or by centrifugal action, or in any other convenient manner. After the two substances are brought together and an intimate mixture effected the mass is allowed to settle and the aqueous acetic acid is decanted. The crystalline magnea of sulphate of lime is put in a press to extract all the acid, which is then added to that previously decanted. The dry cakes of sulphate of lime are then washed in the press until the wash-water exhibits neutrality, and if it be desired to economize these slightly-acidulated waters they may be used in making a subsequent solution of the crude acetate of lime. The crude acetic acid thus obtained contains about twenty per cent. of acid. If it is to be used at this degree of concentration, it should be distilled to remove all traces of sulphate of lime, and in particular all coloring-matters that are found therein. The resulting acid is colorless and almost inodorous.

When for any purpose it is desired to obtain more highly concentrated acids, they can be obtained by repeating the operation first described, with the difference that instead of dissolving the crude acetate of lime in water it is dissolved in the crude acetic acid resulting from the first operation. This solution is treated, as above described, by means of sulphuric acid and at a high temperature. The result of the second operation is a crude acetic acid containing about forty per cent. of acid. As these operations are very easy to perform and require no particular installation or apparatus, (it is possible even to use ordinary wooden tubs lined with lead or not,) they can be repeated until the desired degree of concentration is obtained. It is, however, to be understood that it is necessary in all cases to distill the product in an ordinary still to remove impurities.

We have in the accompanying drawing represented an arrangement of apparatus which we find convenient in producing acetic acid according to our invention. In said drawing, A represents a receiver for the sulphuric acid, and B a receiver for the acetate of lime. C is the mixer or vessel into which, by means of pipes, the sulphuric acid and acetate of lime are admitted. A stirrer consisting of an upright shaft with horizontal blades or arms is arranged in vessel C to effect the intimate mixture of the liquids. The latter vessel is provided with cocks $r$ $r'$ $r''$, placed at different heights, for drawing off the acetic acid, and with a man-hole T to give access to the interior of the vessel for purposes of cleaning.

We claim as our invention—

1. In the production of acetic acid, the herein-described improvement, consisting in acting on a hot solution of acetate of lime with hot sulphuric acid and drawing off the aqueous acetic acid from the crystalline sulphate of lime resulting from the reaction.

2. The described method of producing a concentrated solution of acetic acid by dissolving acetate of lime in a weak solution of acetic acid and decomposing the resulting solution while hot by means of hot sulphuric acid.

In testimony whereof we have signed this specification in the presence of two subscribing witnesses.

IVAR AXEL FERDINAND BANG.
  MARIE CHARLES ALFRED RUFFIN.

Witnesses:
  EUGÉNE DUBOIS,
  CHARLES DION.